(12) United States Patent
Li et al.

(10) Patent No.: US 9,398,484 B2
(45) Date of Patent: Jul. 19, 2016

(54) UE, ENB AND METHOD FOR CHANNEL ACCESS PRIORITY FOR DISTRIBUTED D2D

(71) Applicant: Intel IP Corporation, Santa Clara, CA (US)

(72) Inventors: Qinghua Li, San Ramon, CA (US); Utsaw Kumar, Foster City, CA (US); Huaning Niu, Milpitas, CA (US); Yuan Zhu, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 6 days.

(21) Appl. No.: 14/572,309

(22) Filed: Dec. 16, 2014

(65) Prior Publication Data

US 2015/0312915 A1 Oct. 29, 2015

Related U.S. Application Data (60) Provisional application No. 61/985,342, filed on Apr. 28, 2014.

(51) Int. Cl.

| | | |
|---|---|---|
| *H04W 72/06* | (2009.01) | |
| *H04W 24/10* | (2009.01) | |
| *H04W 52/28* | (2009.01) | |
| *H04W 52/38* | (2009.01) | |
| *H04W 52/04* | (2009.01) | |

(Continued)

(52) U.S. Cl.
CPC ............ *H04W 24/10* (2013.01); *H04W 52/281* (2013.01); *H04W 52/383* (2013.01); *H04W 74/006* (2013.01); *H04W 52/04* (2013.01); *H04W 52/243* (2013.01); *H04W 74/004* (2013.01)

(58) Field of Classification Search
CPC ... H04W 72/06; H04W 24/10; H04W 52/243; H04W 74/002; H04W 52/383
See application file for complete search history.

(56) References Cited

U.S. PATENT DOCUMENTS

| | | |
|---|---|---|
| 2009/0238090 A1 | 9/2009 | Sambhwani et al. |
| 2013/0148566 A1 | 6/2013 | Doppler et al. |

(Continued)

FOREIGN PATENT DOCUMENTS

| | | |
|---|---|---|
| WO | WO-2013009090 A2 | 1/2013 |
| WO | WO-2014063094 A1 | 4/2014 |
| WO | WO-2015167707 A1 | 11/2015 |

OTHER PUBLICATIONS

"International Application Serial No. PCT/US2015/022692, International Search Report mailed Jul. 14, 2015", 11 pgs.

(Continued)

*Primary Examiner* — Kashif Siddiqui
*Assistant Examiner* — Minjung Kim
(74) *Attorney, Agent, or Firm* — Schwegman Lundberg & Woessner, P.A.

(57) ABSTRACT

Embodiments of an evolved Node B (eNB) and methods for determining priority values for User Equipment (UE) are generally described herein. A method performed by circuitry of an eNB may include receiving, at the eNB, a usage report from the UE. The usage report may include information indicating a channel usage time and a transmission power of the UE. The method may include determining, using the usage report, a priority value for the UE. The method may include sending the priority value to the UE, wherein the UE is to utilize the priority value to perform distributed scheduling of device-to-device (D2D) communication over a D2D connection with a second UE.

28 Claims, 7 Drawing Sheets

(51) Int. Cl.
*H04W 74/00* (2009.01)
*H04W 52/24* (2009.01)

(56) References Cited

U.S. PATENT DOCUMENTS

2014/0036876 A1  2/2014  Li et al.
2014/0112233 A1* 4/2014  Bodas ............... H04W 72/1231
                                               370/312

OTHER PUBLICATIONS

"International Application Serial No. PCT/US2015/022692, Written Opinion mailed Jul. 14, 2015", 7 pgs.
Wu. Xinzhou, et al., "FlashLinQ: A Synchronous Distributed Scheduler for Peer-to-Peer Ad Hoc Networks", IEEE/AMC Journal of Transactions on Networking (TON) 21(4), (Aug. 2013), 1215-1228.

* cited by examiner

UE, ENB AND METHOD FOR CHANNEL ACCESS PRIORITY FOR DISTRIBUTED D2D

CLAIM OF PRIORITY

This patent application claims the benefit of priority of U.S. Provisional Patent Application Ser. No. 61/985,342, entitled "Fairness Management for Distributed D2D," filed on Apr. 28, 2014, which is hereby incorporated by reference herein in its entirety.

BACKGROUND

Mobile devices may communicate with each other using device-to-device (D2D) connections. A mobile device may use a device-to-device connection to send or receive data to or from another device directly, or to ultimately connect with a network, such as a mobile network or the internet, via the device-to-device connection. A mobile device's transmission power and connection time may vary depending on the nature and type of data sent or received by the mobile device. When two or more device-to-device connections have active communications in proximity to each other, they may interfere with each other when sending or receiving data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Traditionally, cellular traffic from a User Equipment (UE) goes through a base station, such as an evolved Node B (eNB) in order to connect with a network or another device. Using a device-to-device (D2D) connection, a UE may communicate with another UE in order to directly send or receive data to the other UE, or to ultimately connect with a network. Using the D2D connection, the UE may send or receive data from the other device instead of sending or receiving data directly to or from an eNB. In a D2D connection, a first UE may connect with a second UE to directly send or receive data, without using any other devices. Unlike systems where UEs communicate with an eNB and not each other directly, a system using D2D communications may not be able to rely on a centralized entity to manage contention and scheduling. In a system where devices communicate over WiFi, a scheduling rule, for determining which UE in a set of UEs may initiate communication first, that equalizes opportunity for channel access for the devices based on a transmission power-independent fairness rule may be used. The WiFi scheduling rule may assume an equal transmission power for all devices, such as when interference footprints are equal for all devices. This transmission power-independent scheduling rule may not be adequate when transmission power is not equal for all devices, such as when interference footprints are not equal for all devices.

As discussed herein, in a Wireless Network operating as a 3rd Generation Partnership Project (3GPP) long term evolution (LTE) or LTE-advanced network or other cellular phone networks, the transmission power may be optimized for each link between a UE and another device (e.g., another UE for D2D, or an eNB, etc.) for high spatial reuse or optimized power consumption. When transmission power is optimized for each link, the transmission power for each link may not be equal and a transmission power-independent scheduling rule may be sub-optimal. Scheduling a large number of low-power links concurrently may lead to a higher overall throughput than having a small number (e.g., one or two) high-power links transmitting. The small number of high-power links may render communication over other low-power links difficult or impossible because of high interference. The prior channel usage time may be used to ensure fairness when scheduling, giving a chance to all links (low or high power) to get scheduled. Using transmission power and channel usage time may allow a coordinator device or coordinator system to rank UEs according to fairness in a priority map. This priority mapping may be better than a round-robin or random priority assignment that does not take prior channel usage time or transmission power into consideration. The priority values may facilitate scheduling D2D links in a distributed fashion, such as without a central entity (e.g., eNB).

In an example, a UE may send a usage report to a coordinator device, such as an eNB, a wireless access point system, another UE, mobile station, computer, laptop, tablet, master station, WiFi direct device, or the like. A wireless access point system may include a wireless router or a wireless hotspot device. The usage report may include channel usage time and transmission power for the UE sending the usage report. The usage report may include prior channel usage time, such as time the UE has spent on the channel over a specified period of time.

In another example, the coordinator device may generate a priority map or set of priority parameters. The priority map may include a prioritized list of D2D UE links, and the prioritized list may include priority for a D2D UE link for the UE to communicate over a D2D connection. A high priority of a UE may include a low transmission power or a short channel usage time or both. Priority may also include Quality of Service (QoS) information, location information, device information, pending connection time, last connection time, or other parameters, that may push a particular D2D link to a higher priority.

Figure 1:
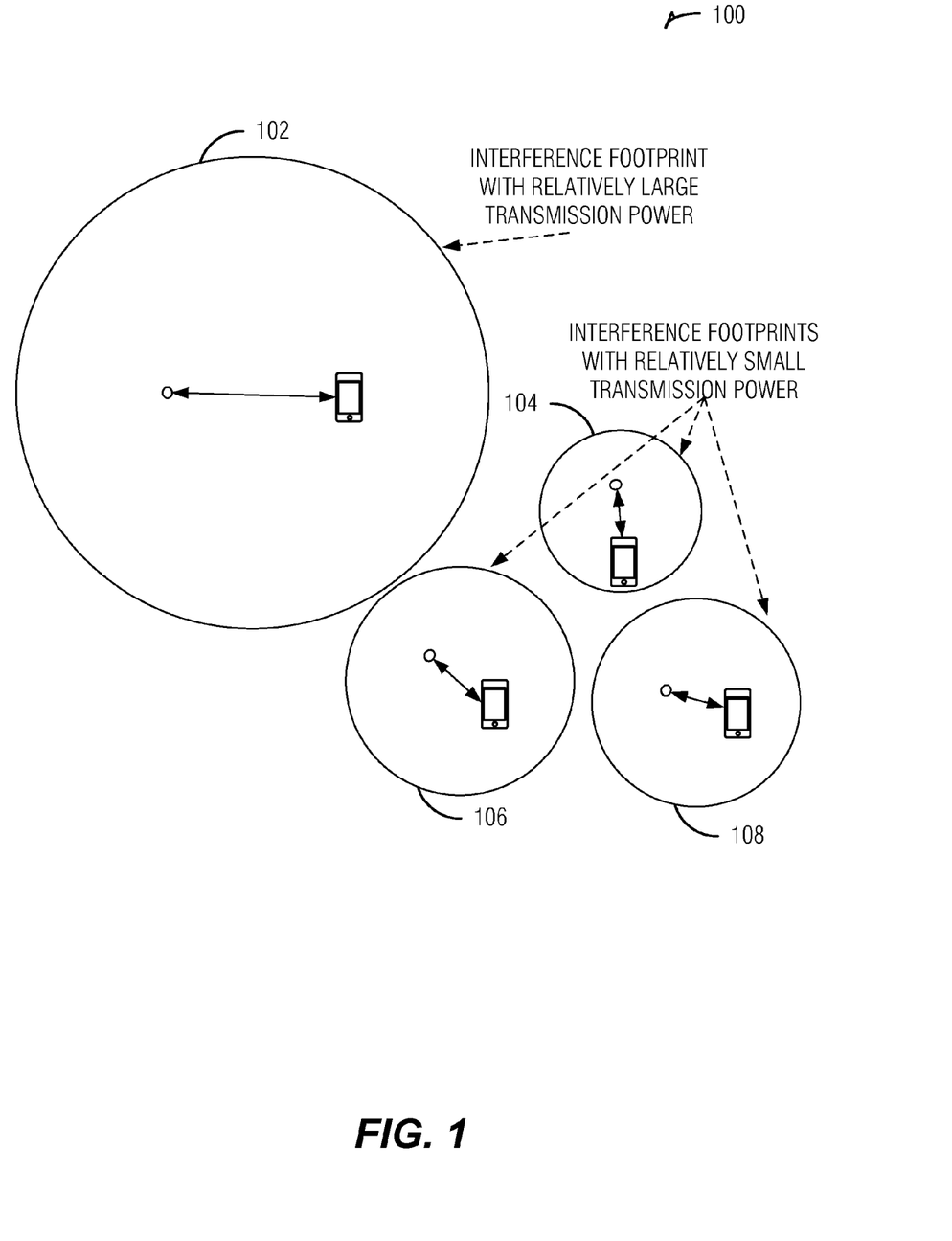
FIG. 1 illustrates generally a diagram showing a system of User Equipment interference footprints in accordance with some embodiments.

FIG. 1 illustrates generally a diagram showing a system 100 of User Equipment interference footprints in accordance with some embodiments. In an example, an interference footprint is higher in a UE when the transmission power of the UE is higher. The interference footprint 102 in the system 100, for example, is relatively larger than the interference footprints 104, 106, and 108, and therefore, the UE with the interference footprint 102 may be based on a relatively larger transmission power than UEs with interference footprints 104, 106, and 108. When the UE with the relatively large interference footprint 102 communicates with a device in a D2D connection, the UE consumes more channel resources in space than the UEs with the relatively small interference footprints 104, 106, and 108. As system 100 illustrates, the three UEs with relatively small interference footprints 104, 106, and 108 may use about the same amount of space as the UE with the relatively large interference footprint 102 when communicating over D2D connections.

In an example, UE communicating over a D2D connection may have a link with a 4 Watt transmission power. The 4 Watt link may consume the same space as four other UEs with only 1 Watt transmission power links apiece in free space. However, if the 4 Watt link has a longer communication distance, the 4 Watt link may have a similar throughput to one of the 1 Watt transmission power links. Thus, the four UEs with 1 Watt links combined may have a greater throughput than the 4 Watt link but with similar transmission power totals. Prioritizing the 1 Watt links will allow for a higher total throughput among all five devices than if the 4 Watt link was prioritized over any of the 1 Watt links. Prioritizing a link according to its transmission power may enable a network to utilize more links and achieve a higher network throughput.

In another example, if a UE has a long link, it may use a higher power transmission. In this example, the UE and link may never reach a high enough priority to connect in a D2D connection over the link. The link may be cut off if it does not connect in a timely fashion and the UE may connect instead to a different, closer UE or to a base station, such as a eNB. In an example, a low priority link may not schedule communication and if the low priority link does not schedule communication over a number of cycles, it may be severed so that the UE may access a network or other device directly over an alternate link. If a UE does not get scheduled over any links over time, the UE may connect to a base station, such as an eNB instead of waiting for a priority ranking that would allow the UE to communicate over a D2D connection. In an example, an eNB may send information or data to a UE and the UE may forward the information or data to a second UE using a D2D connection between the UE and the second UE.

Figure 2:
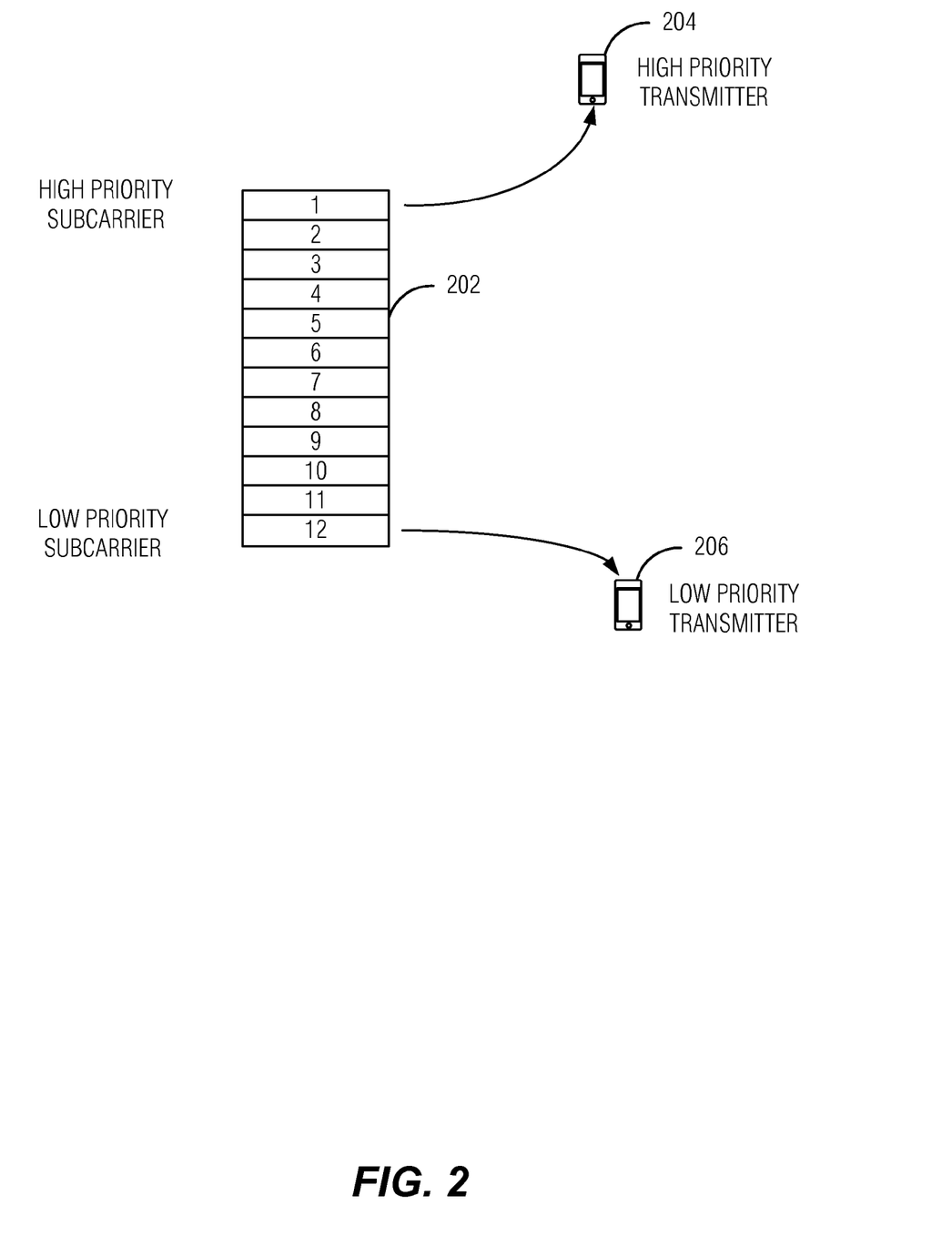
FIG. 2 illustrates generally a diagram showing a priority map of User Equipment priority rankings in accordance with some embodiments.

FIG. 2 illustrates generally a diagram showing a priority map 202 of User Equipment priority rankings in accordance with some embodiments. In an example, a D2D connection link from a UE to another UE may be associated with a unique priority number in a priority ranking 202. A high priority transmitter 204 may be given a lower priority number (i.e., high priority subcarrier frequency 1 in the priority ranking 202) and a low priority transmitter 206 may be given a higher priority number (i.e., low priority subcarrier frequency 12 in the priority ranking 202). A priority ranking 202 may be relative to other UEs or absolute based on power transmission of a UE. The unique priority number may be mapped to a unique frequency subcarrier for a channel contention by the UE. Making the priority numbers unique may help prevent collision in contention transmissions among the UEs. In an example, the priority number for a UE may be determined using the transmission power of the link for the UE in the D2D connection compared to the links for other UEs in D2D connections with the same end device. For example, a 0.1 Watt link for a first UE may have a higher priority than a 1 Watt link for a second UE, but a lower priority than a 0.01 Watt link for a third UE, when the first, second, and third UEs are all connected to other UEs (any combination of the first, second, and third UEs may also connect to the same other UE or UEs) in D2D connections.

Figure 3:
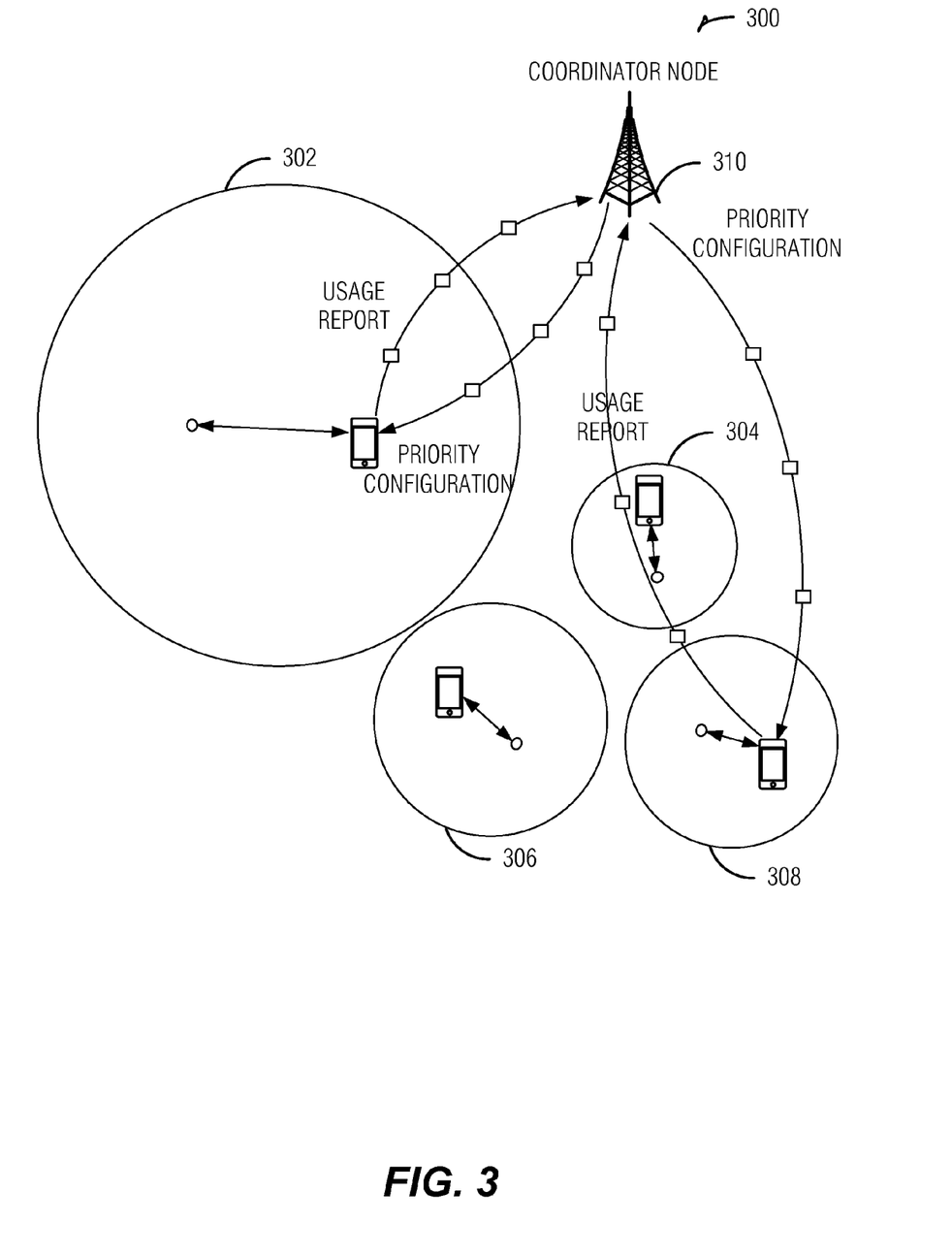
FIG. 3 illustrates generally a diagram showing a system of User Equipment and a coordinator node in accordance with some embodiments.

FIG. 3 illustrates generally a diagram showing a system 300 of User Equipment and a coordinator node in accordance with some embodiments. In an example, a priority value for a first UE may be determined by a transmission power of the UE in a D2D connection link with a second UE. To determine the priority value, an entity in a system 300 that includes the D2D connection link may be used. The entity may be a coordinator node 310, such as a group owner UE, an eNB, a wireless access point system, or the like. A UE 302 in the network may send the coordinator channel usage information and transmission power for a link in the network. The coordinator node 310 may compile channel usage information and transmission power for a plurality of UEs 304, 306, and 308 attempting to connect with one or more predetermined UEs in a D2D connection. The coordinator node 310 may determine a priority map with a ranking of the plurality of UEs 304, 306, and 308 according to transmission power or interference footprints and channel usage. If no coordinator node 310 is present, the plurality of UEs 304, 306, and 308 and the UE 302 may exchange reports about channel usage, transmission power, and priority. The UEs may determine a priority map and rankings without the use of a coordinator node 310. The UEs may use a mesh network to determine the priority map without the coordinator node 310. A specified UE may act as the coordinator node 310, and the specified UE may rotate according to a schedule or arbitrarily.

The coordinator node 310, if present, or the UEs may adjust the fairness and maintain the uniqueness of the priority map. The adjustment may include determining if a fairness metric for a specified UE is within a fairness range and changing the priority value for the specified UE or sending an indication to the specified UE to not initiate D2D communication if the fairness metric is outside the fairness range. The fairness range may include an average, sum, median, or other central tendency of fairness metrics for other UEs. The fairness metric for the specified UE may be outside the fairness range if the fairness metric is below or above the fairness range boundaries. If the fairness metric is below the fairness range lower boundary, the priority value for the specified UE may be adjusted up. If the fairness metric is above the fairness range upper boundary, the priority value for the specified UE may be adjusted down. A UE's ranking in the priority map may be unique according to power transmission. The UE may know its own ranking but may or may not know priority rankings of other UEs. If the fairness metric is outside the fairness range, the coordinator node 310 may send an indication to the UE to not initiate D2D communication with a second UE.

In an example, the coordinator node 310 may send priority information to UE 302. The coordinator node 310 may check collected reports to determine whether a priority value for a specified UE should be increased or decreased on average according to a fairness metric. The fairness metric may include an interference footprint or an interference volume. The interference footprint for a specified UE may include an area, such as the area defined by a circle with a radius equal to or approximately equal to the transmission power of the specified UE. The interference volume for the specified UE may include the area of the interference footprint multiplied by the channel usage time for the specified UE. The coordinator node 310 may send information to a UE, the information conveying a unique priority number for a link connected to the UE or for each channel contention of the UE or a plurality of UEs. The coordinator node 310 may broadcast a priority map allocating a ranking to various UEs.

In an example, a priority value may include a rank in a priority map, a fairness metric may include an interference footprint multiplied by a channel usage time, and the interference footprint may include an area related to transmission power. The fairness metric may include computing an interference footprint along with some other factors. If a UE has a higher priority value or higher rank in a priority map, the UE will have a higher chance of getting scheduled than another UE with a lower priority value or lower rank in the priority map.

Figure 4:
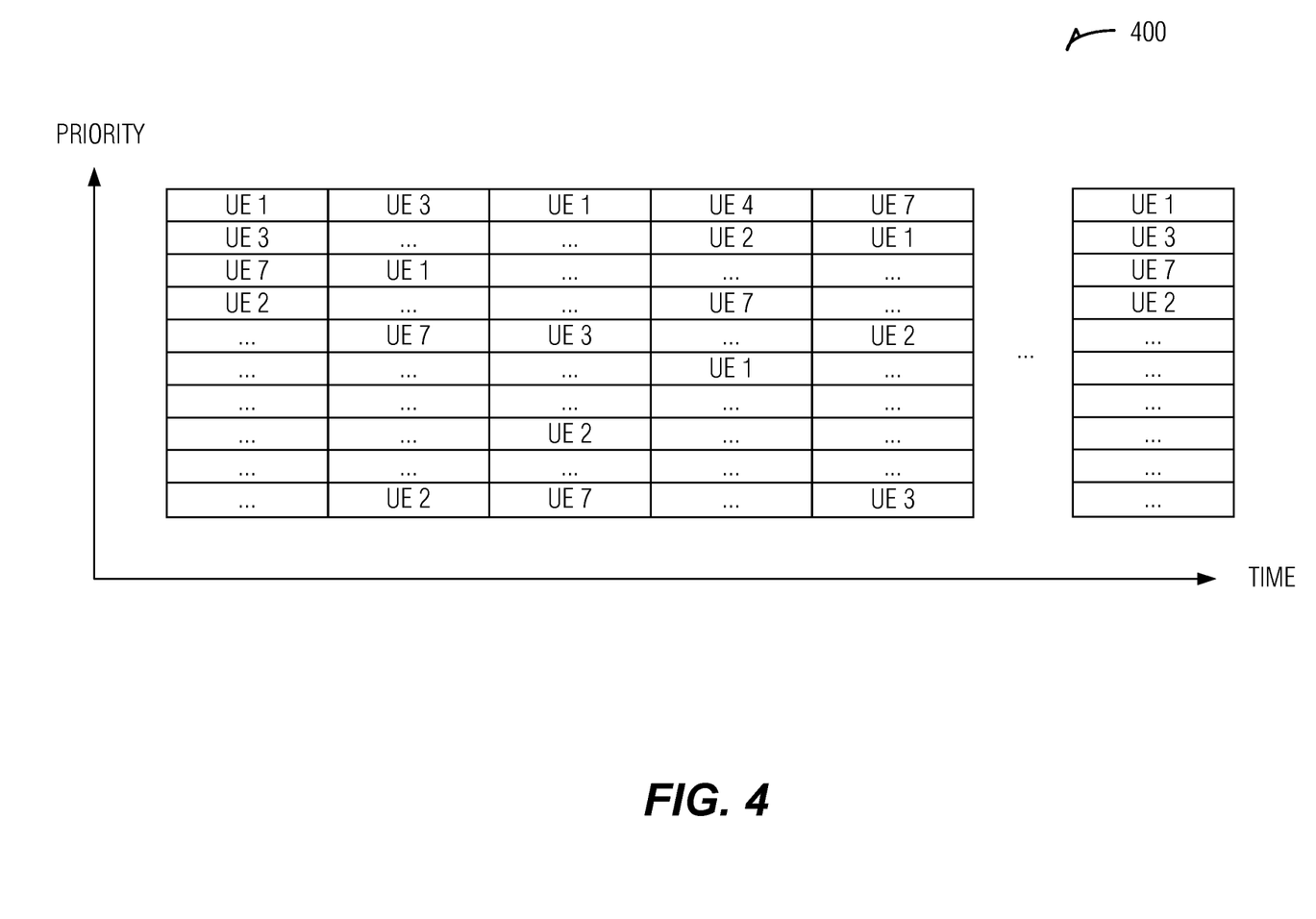
FIG. 4 illustrates generally a diagram showing a priority map 400 over time in accordance with some embodiments.

FIG. 4 illustrates generally a diagram showing a priority map 400 over time in accordance with some embodiments. The priority map 400 may be sent by a coordinator node to the UEs listed in the priority map 400. The priority map 400 may include a unique priority number for each channel contention or UE. The priority map may change over time as transmission power, channel usage time, and UEs in a system change over time. The priority map 400 may be determined using throughput targets or fairness constraints, such as latency, interference, throughput, power, etc. In an example, the coordinator node may manipulate the priority map using past information.

Other factors that may contribute to the rankings in the priority map may include data rates, power, quality of service required, signal to noise ratio of a UE, etc. For example, a higher data rate for a UE may include a higher priority, a higher power may include a lower priority, or a higher required quality of service may include a higher priority. A signal to noise ratio for a UE may be proportionate to a data rate and a higher signal to noise ratio for the UE may include a higher priority for the UE in a priority ranking. A UE with a higher data rate may include a UE capable of single-input and multiple-output (SIMO), multiple-input and single-output (MISO), or multiple-input and multiple-output (MIMO) transmission, and a UE with a lower data rate may include a UE only capable of single-input and single-output (SISO). A UE capable of MIMO transmission may have a higher data rate than UEs capable of SIMO, MISO, or SISO. A UE may use a signal multiplexing scheme, such as an orthogonal frequency-division multiplexing (OFDM) scheme to send and receive data on parallel data streams or channels. The OFDM scheme may allow a UE to have a higher data rate than a UE that is not capable of using the OFDM scheme.

Figure 5:
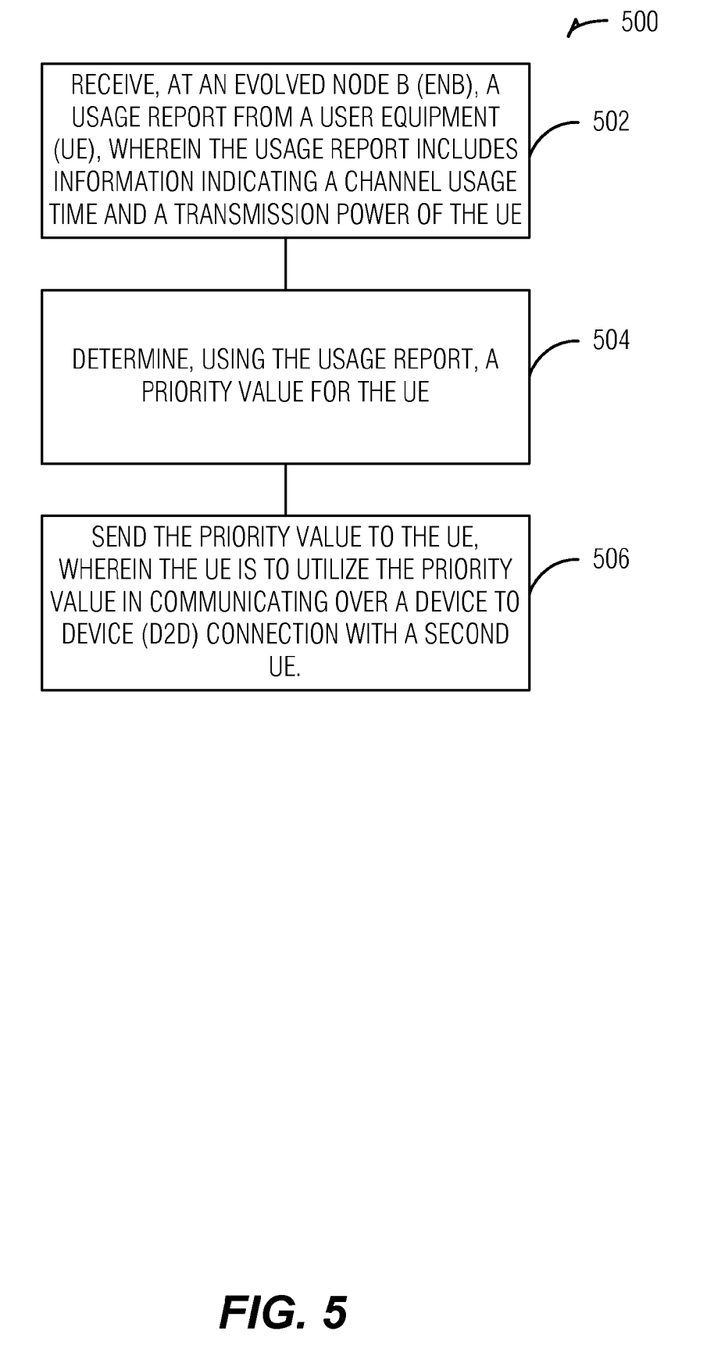
FIG. 5 illustrates generally a flowchart showing a method for determining a priority value for a User Equipment.

FIG. 5 illustrates generally a flowchart showing a method 800 for determining a priority value for a User Equipment. In an example, the method 800 may include an operation 802 to receive, at an eNB, a usage report from a UE, wherein the usage report includes information indicating a channel usage time and a transmission power of the UE. The method may include an operation 804 to determine, using the usage report, a priority value for the UE. The method may include an operation 806 to send the priority value to the UE, wherein the UE is to utilize the priority value in communicating over a device to device (D2D) connection with a second UE.

Figure 6:
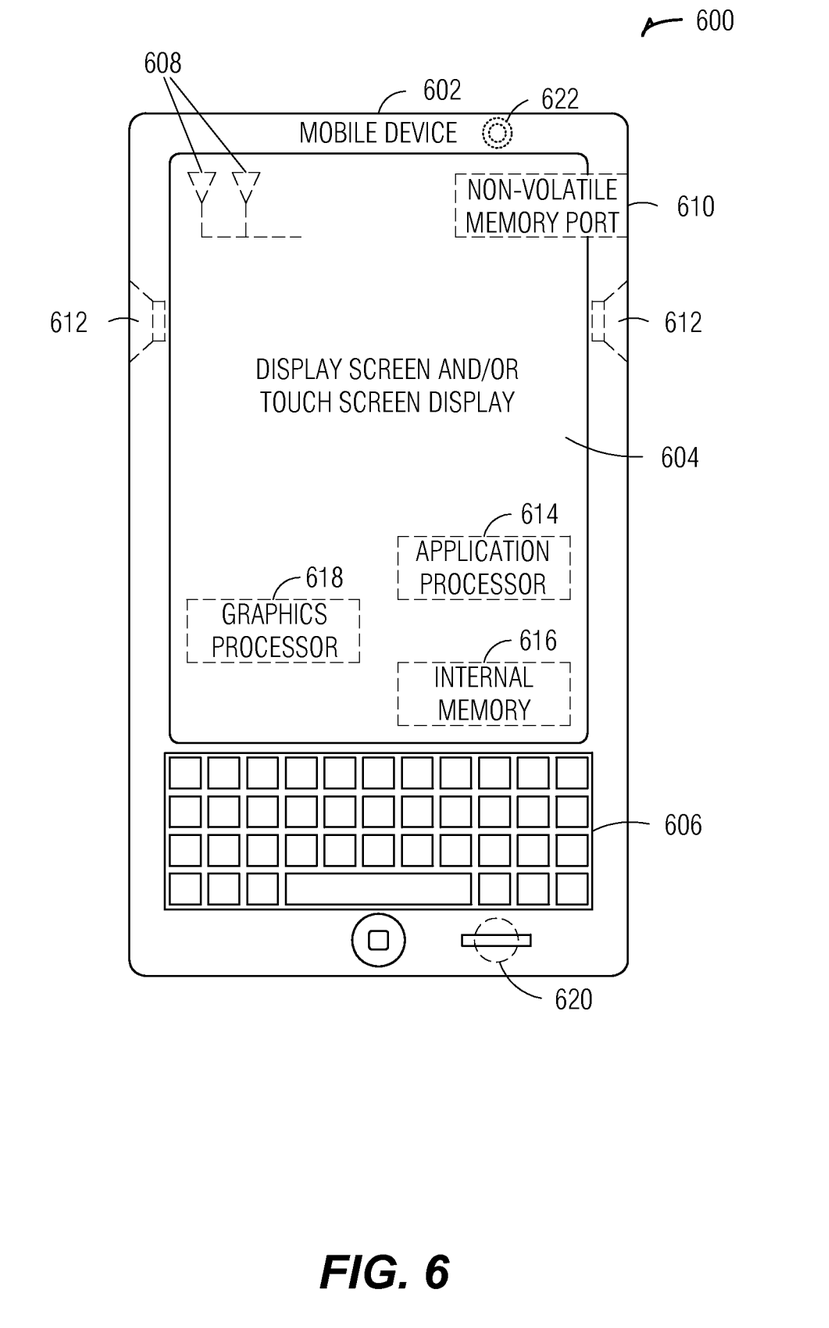
FIG. 6 illustrates generally a diagram showing a mobile client device on which the configurations and techniques described herein may be deployed in accordance with some embodiments.

FIG. 6 illustrates generally a diagram showing a mobile client device on which the configurations and techniques described herein may be deployed in accordance with some embodiments. FIG. 6 provides an example illustration of a mobile device 600, such as a user equipment (UE), a mobile station (MS), a mobile wireless device, a mobile communication device, a tablet, a handset, or other type of mobile wireless computing device. The mobile device 600 may include one or more antennas 608 within housing 602 that are configured to communicate with a hotspot, base station (BS), an eNB, or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device 600 may communicate using separate antennas for each wireless communication standard or shared antennas for multiple wireless communication standards. The mobile device 600 may communicate in a WLAN, a WPAN, and/or a WWAN.

FIG. 6 also provides an illustration of a microphone 620 and one or more speakers 612 that may be used for audio input and output from the mobile device 600. A display screen 604 may be a liquid crystal display (LCD) screen, or other type of display screen such as an organic light emitting diode (OLED) display. The display screen 604 may be configured as a touch screen. The touch screen may use capacitive, resistive, or another type of touch screen technology. An application processor 614 and a graphics processor 618 may be coupled to internal memory 616 to provide processing and display capabilities. A non-volatile memory port 610 may also be used to provide data input/output options to a user. The non-volatile memory port 610 may also be used to expand the memory capabilities of the mobile device 600. A keyboard 606 may be integrated with the mobile device 600 or wirelessly connected to the mobile device 600 to provide additional user input. A virtual keyboard may also be provided using the touch screen. A camera 622 located on the front (display screen) side or the rear side of the mobile device 600 may also be integrated into the housing 602 of the mobile device 600.

Figure 7:
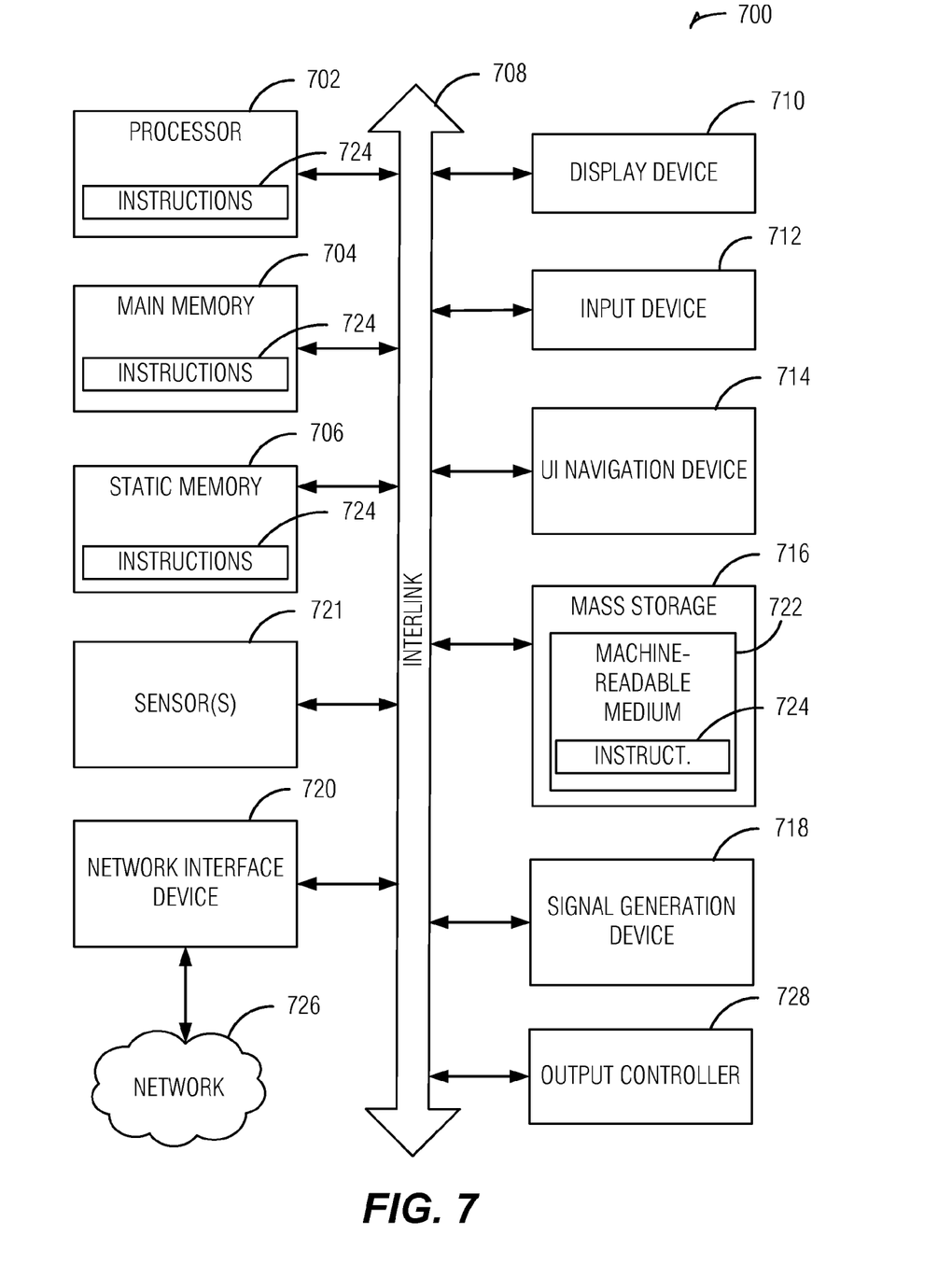
FIG. 7 illustrates generally an example of a block diagram of a machine upon which any one or more of the techniques (e.g., methodologies) discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 includes the subject matter embodied by an evolved Node B (eNB) comprising: hardware processing circuitry to: receive a usage report from a User Equipment (UE), wherein the usage report includes information indicating a channel usage time and a transmission power of the UE, determine, using the usage report, a priority value for the UE, and send the priority value to the UE for use in device-to-device (D2D) communication with a second UE.

In Example 2, the subject matter of Example 1 can optionally include wherein the priority value is a ranking in a priority map.

In Example 3, the subject matter of one or any combination of Examples 1-2 can optionally include wherein to determine the priority value for the UE, the hardware processing circuitry is to prioritize lower channel usage time and lower transmission power within the priority map.

In Example 4, the subject matter of one or any combination of Examples 1-3 can optionally include wherein to determine the priority value for the UE, the hardware processing circuitry is to assign the UE higher priority access to channel resources for the D2D communication when the UE uses a lower transmission power than other UEs in the priority map.

In Example 5, the subject matter of one or any combination of Examples 1-4 can optionally include wherein to determine the priority value for the UE, the hardware processing circuitry is to assign the UE higher priority access to channel resources for the D2D communication when the UE has a lower channel usage time than other UEs in the priority map.

In Example 6, the subject matter of one or any combination of Examples 1-5 can optionally include wherein the priority map comprises a plurality of priority values for a plurality of UEs.

In Example 7, the subject matter of one or any combination of Examples 1-6 can optionally include wherein the hardware processing circuitry is further to evaluate the usage report to determine if a fairness metric for the UE is within a fairness range, and if the fairness metric is outside the fairness range, send an indication to the UE to not initiate D2D communication with the second UE.

In Example 8, the subject matter of one or any combination of Examples 1-7 can optionally include wherein the hardware processing circuitry is further to identify an area of an interference footprint, the area of the interference footprint including a circle with a radius approximately equal to the transmission power.

In Example 9, the subject matter of one or any combination of Examples 1-8 can optionally include wherein the fairness metric includes an interference volume, the interference volume including the area of the interference footprint multiplied by the channel usage time.

In Example 10, the subject matter of one or any combination of Examples 1-9 can optionally include wherein the hardware processing circuitry is further to send data to the UE to be forwarded to the second UE via the D2D connection from the UE to the second UE.

In Example 11, the subject matter of one or any combination of Examples 1-10 can optionally include wherein the data includes data indicating a priority assignment for the second UE.

Example 12 includes the subject matter embodied by a User Equipment (UE) comprising: processing circuitry to identify information about channel usage time and transmission power of the UE for use in device-to-device (D2D) communication with a second UE, and a transceiver, coupled to the processing circuitry to: transmit a usage report to a coordinator system, wherein the usage report includes the information about the channel usage time and the transmission power of the UE, receive, from the coordinator system, a priority value for the UE, wherein the priority value is a ranking in a priority map, and initiate communication over a D2D connection with the second UE using the priority value.

In Example 13, the subject matter of Example 12 can optionally include wherein the coordinator system is an evolved Node B (eNB).

In Example 14, the subject matter of one or any combination of Examples 12-13 can optionally include wherein the coordinator system is a wireless access point system.

In Example 15, the subject matter of one or any combination of Examples 12-14 can optionally include wherein to initiate communication over the D2D connection, the transceiver is further to use higher priority access to channel resources for D2D communication when a combination of the transmission power and channel usage time are lower for the UE than for other UEs connected to the second UE.

In Example 16, the subject matter of one or any combination of Examples 12-15 can optionally include wherein the processing circuitry is further to determine a fairness metric for the UE, the fairness metric including an interference volume.

In Example 17, the subject matter of one or any combination of Examples 12-16 can optionally include wherein the transceiver is further to: transmit the fairness metric to the coordinator system, and receive an adjustment for the priority value, the adjustment based on the usage report, the fairness metric, and a fairness range.

In Example 18, the subject matter of one or any combination of Examples 12-17 can optionally include further comprising memory coupled to the processor.

In Example 19, the subject matter of one or any combination of Examples 12-18 can optionally include further comprising one or more antennas coupled to the transceiver.

In Example 20, the subject matter of one or any combination of Examples 12-19 can optionally include wherein the priority value is a ranking in a priority map.

In Example 21, the subject matter of one or any combination of Examples 12-20 can optionally include wherein when the priority value for the UE does not rank highest in the priority map, the transceiver is further to, in response to receiving an indication that a third UE with a higher priority value than the priority value for the UE is in D2D communication with the second UE, initiate D2D communication over the D2D connection for spatial reuse.

Example 22 includes the subject matter embodied by a method performed by circuitry of an evolved Node B (eNB) comprising: receiving, at the eNB, a usage report from a User Equipment (UE), wherein the usage report includes information indicating a transmission power of the UE, determining, using the usage report, a priority value for the UE, and sending the priority value to the UE, wherein the UE is to utilize the priority value in communicating over a device-to-device (D2D) connection with a second UE.

In Example 23, the subject matter of Example 22 can optionally include further comprising, evaluating the usage report to determine if a fairness metric for the UE is within a fairness range, and adjusting the priority value if the fairness metric is outside the fairness range.

In Example 24, the subject matter of one or any combination of Examples 22-23 can optionally include further comprising determining an area of an interference footprint, the area of the interference footprint including a circle with a radius approximately equal to the transmission power.

In Example 25, the subject matter of one or any combination of Examples 22-24 can optionally include wherein the fairness metric includes an interference volume, the interference volume including the area of the interference footprint multiplied by a channel usage time.

In Example 26, the subject matter of one or any combination of Examples 22-25 can optionally include wherein the priority value is a ranking in a priority map.

In Example 27, the subject matter of one or any combination of Examples 22-26 can optionally include wherein determining the priority value includes prioritizing and a low transmission power within the priority map.

In Example 28, the subject matter of one or any combination of Examples 22-27 can optionally include wherein determining the priority value includes assigning the UE higher priority access to channel resources for communicating over the D2D connection when the UE uses a lower transmission power than other UEs in the priority map.

In Example 29, the subject matter of one or any combination of Examples 22-28 can optionally include wherein determining the priority value includes assigning the UE higher priority access to channel resources for communicating over the D2D connection when the UE has a lower channel usage time than other UEs in the priority map.

In Example 30, the subject matter of one or any combination of Examples 22-29 can optionally include wherein the priority map comprises a plurality of priority values for a plurality of UEs.

In Example 31, the subject matter of one or any combination of Examples 22-30 can optionally include further comprising, sending data to the UE to be forwarded to the second UE via the D2D connection from the UE to the second UE.

In Example 32, the subject matter of one or any combination of Examples 22-31 can optionally include wherein the data includes data indicating a priority assignment for the second UE.

Example 33 includes an apparatus comprising means for performing any of the methods of Examples 22-32.

Example 34 includes at least one machine-readable medium including instructions for receiving information, which when executed by a machine, cause the machine to perform any of the methods of Examples 22-32.

Example 35 includes the subject matter embodied by an apparatus comprising: means for receiving, at the eNB, a usage report from a User Equipment (UE), wherein the usage report includes information indicating a channel usage time and a transmission power of the UE, means for determining, using the usage report, a priority value for the UE, and means for sending the priority value to the UE, wherein the UE is to utilize the priority value in communicating over a device-to-device (D2D) connection with a second UE.

Example 36 includes the subject matter embodied by at least one machine-readable medium including instructions for operation of a computer system, which when executed by a machine, cause the machine to: receive, at an evolved Node B (eNB), a usage report from a User Equipment (UE), wherein the usage report contains information indicating a channel usage time and a transmission power of the UE, determine, using the usage report, a priority value for the UE, and send the priority value to the UE, wherein the UE is to utilize the priority value in communicating over a device-to-device (D2D) connection with a second UE.

In Example 37, the subject matter of Example 36 can optionally include wherein the priority value is a ranking in a priority map.

In Example 38, the subject matter of one or any combination of Examples 36-37 can optionally include wherein to determine the priority value for the UE includes to prioritize lower channel usage time and lower transmission power within the priority map.

In Example 39, the subject matter of one or any combination of Examples 36-38 can optionally include wherein to determine the priority value includes to assign the UE higher priority access to channel resources for communicating over the D2D connection when the UE uses a lower transmission power than other UEs in the priority map.

In Example 40, the subject matter of one or any combination of Examples 36-39 can optionally include wherein to determine the priority value includes to assign the UE higher priority access to channel resources for communicating over the D2D connection when the UE has a lower channel usage time than other UEs in the priority map.

In Example 41, the subject matter of one or any combination of Examples 36-40 can optionally include wherein the priority map comprises a plurality of priority values for a plurality of UEs.

In Example 42, the subject matter of one or any combination of Examples 36-41 can optionally include further comprising operations to send data to the UE to be forwarded to the second UE via the D2D connection from the UE to the second UE.

In Example 43, the subject matter of one or any combination of Examples 36-42 can optionally include further comprising operations to evaluate the usage report to determine if a fairness metric for the UE is within a fairness range, and if the fairness metric is outside the fairness range, to send an indication to the UE to not initiate D2D communication with the second UE.

In Example 44, the subject matter of one or any combination of Examples 36-43 can optionally include further comprising operations to determine an area of an interference footprint, the area of the interference footprint including a circle with a radius approximately equal to the transmission power.

In Example 45, the subject matter of one or any combination of Examples 36-44 can optionally include wherein the fairness metric includes an interference volume, the interference volume including the area of the interference footprint multiplied by the channel usage time.

In Example 46, the subject matter of one or any combination of Examples 36-45 can optionally include wherein the data includes data indicating a priority assignment for the second UE.

The above detailed description includes references to the accompanying drawings, which form a part of the detailed description. The drawings show, by way of illustration, specific embodiments. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations.

What is claimed is:

1. An evolved Node B (eNB), the eNB comprising:
hardware processing circuitry to:
receive a usage report from a User Equipment (UE), wherein the usage report includes information indicating a channel usage time and a transmission power of the UE;
determine, using the usage report, a priority value within a priority map for the UE by prioritizing lower channel usage time and lower transmission within the priority map; and
send the priority value to the UE for use in device to device (D2D) communication with a second UE.

2. The eNB of claim 1, wherein to determine the priority value for the UE, the hardware processing circuitry is to assign the UE higher priority access to channel resources for the D2D communication when the UE uses a lower transmission power than other UEs in the priority map.

3. The eNB of claim 1, wherein to determine the priority value for the UE, the hardware processing circuitry is to assign the UE higher priority access to channel resources for the D2D communication when the UE has a lower channel usage time than other UEs in the priority map.

4. The eNB of claim 1, wherein the priority map comprises a plurality of priority values for a plurality of UEs.

5. The eNB of claim 1, wherein the hardware processing circuitry is further to evaluate the usage report to determine if a fairness metric for the UE is within a fairness range, and if the fairness metric is outside the fairness range, send an indication to the UE to not initiate D2D communication with the second UE.

6. The eNB of claim 5, wherein the hardware processing circuitry is further to identify an area of an interference footprint, the area of the interference footprint based on the transmission power.

7. The eNB of claim 6, wherein the fairness metric includes an interference volume, the interference volume including the area of the interference footprint multiplied by the channel usage time.

8. The eNB of claim 1, wherein the hardware processing circuitry is further to send data to the UE to be forwarded to the second UE via the D2D connection from the UE to the second UE.

9. The eNB of claim 8, wherein the data includes data indicating a priority assignment for the second UE.

10. A User Equipment (UE), the UE comprising:
processing circuitry to identify information about channel usage time and transmission power of the UE for use in device-to-device (D2D) communication with a second UE; and
a transceiver, coupled to the processing circuitry to:
transmit a usage report to a coordinator system, wherein the usage report includes the information about the channel usage time and the transmission power of the UE;
receive, from the coordinator system, a priority value for the UE, wherein the priority value is a ranking in a priority map; and
initiate communication over a D2D connection with the second UE using the priority value.

11. The UE of claim 10, wherein the coordinator system is an evolved Node B (eNB) operating in a 3GPP LTE cellular network.

12. The UE of claim 10, wherein the coordinator system is a wireless access point operating in an IEEE 802.11 network.

13. The UE of claim 10, wherein to initiate communication over the D2D connection, the transceiver is further to use higher priority access to channel resources for D2D communication when a combination of the transmission power and channel usage time are lower for the UE than for other UEs connected to the second UE.

14. The UE of claim 10, wherein the processing circuitry is further to determine a fairness metric for the UE, the fairness metric including an interference volume.

15. The UE of claim 14, wherein the transceiver is further to:
transmit the fairness metric to the coordinator system; and
receive an adjustment for the priority value, the adjustment based on the usage report, the fairness metric, and a fairness range.

16. The UE of claim 10, further comprising memory coupled to the processor.

17. The UE of claim 10, further comprising one or more antennas coupled to the transceiver.

18. The UE of claim 10, wherein the priority value is a ranking in a priority map.

19. The UE of claim 18, wherein when the priority value for the UE does not rank highest in the priority map, the transceiver is further to, in response to receiving an indication that a third UE with a higher priority value than the priority value for the UE is in D2D communication with the second UE, initiate D2D communication over the D2D connection for spatial reuse.

20. At least one machine-readable medium including instructions for operation of a computing system, which when executed by a machine, cause the machine to:
receive, at an evolved Node B (eNB), a usage report from a User Equipment (UE), wherein the usage report contains information indicating a channel usage time and a transmission power of the UE;
determine, using the usage report, a priority value for the UE; and
send the priority value to the UE, wherein the UE is to utilize the priority value in communicating over a device to device (D2D) connection with a second UE.

21. The at least one machine-readable medium of claim 20, wherein the priority value is a ranking in a priority map.

22. The at least one machine-readable medium of claim 21, wherein to determine the priority value for the UE includes to prioritize lower channel usage time and lower transmission power within the priority map.

23. The at least one machine-readable medium of claim 22, wherein to determine the priority value includes to assign the UE higher priority access to channel resources for communicating over the D2D connection when the UE uses a lower transmission power than other UEs in the priority map.

24. The at least one machine-readable medium of claim 22, wherein to determine the priority value includes to assign the UE higher priority access to channel resources for communicating over the D2D connection when the UE has a lower channel usage time than other UEs in the priority map.

25. A method performed by circuitry of an evolved node B (eNB), the method comprising:
   receiving, at the eNB, a usage report from a User Equipment (UE), wherein the usage report includes information indicating a transmission power and channel usage time of the UE;
   determining, using the usage report, a priority value for the UE, wherein the priority value indicates the UE has priority to communicate over a device to device (D2D) connection with a second UE; and
   evaluating the usage report to determine if a fairness metric for the UE is within a fairness range, and if the fairness metric is outside the fairness range, sending an indication to the UE to not initiate D2D communication with the second UE.

26. The method of claim 25, further comprising, sending the priority value to the UE, wherein the UE is to utilize the priority value in communicating over a device to device (D2D) connection with a second UE.

27. The method of claim 26, further comprising determining an area of an interference footprint, the area of the interference footprint based on the transmission power.

28. The method of claim 27, wherein the fairness metric includes an interference volume, the interference volume including the area of the interference footprint multiplied by a channel usage time for the UE.

\* \* \* \* \*